Patented July 8, 1941

2,248,153

UNITED STATES PATENT OFFICE 2,248,153

METHOD FOR EMULSIFYING THE ESSENTIAL PRINCIPLES OF HOPS

Lyndon D. Wood, Chicago, Ill., assignor to National Hops Laboratories, Inc., Chicago, Ill., a corporation No Drawing. Application July 20, 1938, Serial No. 220,331

7 Claims. (Cl. 99—50.5)

This application is an improvement on and in part a continuation of applicant's copending application, Serial No. 151,754, filed July 2, 1937.

The object of this invention is a new method or process for emulsifying the essential principles of hops.

An emulsion is a mixture in which an insoluble substance is held in suspension in a soluble one. Emulsions have been used for a long period of time in medicine and, more recently, in industry. Their use is now very common in both fields.

In order to make an emulsion, it is generally necessary that the insoluble material held in suspension be very finely divided, otherwise the materials will separate in the container. When that occurs, it is necessary to shake the mixture each time before it is used.

In the making of emulsions it has been found necessary heretofore to employ what is known as an emulsifying agent in the form of a tasteless, odorless gum such as tragacanth or gum acacia. Small amounts of these gums, which are readily soluble in water are mixed with the insoluble material, and the mass is beaten in machines designed for the purpose. The beating or pounding has the effect of finely dividing the material which it is desired to emulsify and hold in suspension.

In medicine many remedies which it is desired to administer are thus emulsified. It is claimed for the use of emulsions that in emulsified form the odor and taste is blanketed, and they are unobjectionable to the patient. Also, because of the fine division, they are much more readily assimilated and more quickly and easily digested. The same claim is made for those which are used industrially, that is, that this small division of the essential material makes it possible for it to be more readily mixed and dissolved in whatever it is planned to use it, and that the time of mixing and assimilating is very much shortened.

No emulsion of the essential principles of hops has heretofore been made, so far as I am able to find.

I have made many experiments and attempts to emulsify hops, and was unable to make a satisfactory emulsion until the present process was developed by me. The difficulty in making an emulsion of hops is probably due to the fact that it has been extremely difficult to effect a satisfactory division of the resins chiefly found in the lupulin of the hops. In my experiments, I have tried combining them with purified mineral oils, which are a very common component of emulsions. I have tried many vegetable oils such as cotton seed oil, soy bean oil, corn oil, flax seed oil, sesame oil, etc. I have also tried animal fats and oils such as butter, lard, fish oil, etc.

The process I have designed is entirely new, and seems to work perfectly. Emulsions made by this process have been kept for weeks and months, and I find no separation by precipitation or otherwise into their component parts. The process I have designed for making this emulsion is as follows:

I take one part or portion of any hops extract or concentrate, made by any suitable process, but preferably by the process herein described, in which my first procedure is to suitably prepare the hops by pulverizing them to a degree of fineness by which they will pass a 20 mesh screen or sieve. This may be done in any one of several types of mills which can be adapted for the work. The mill should be enclosed in such a way that no air currents are present in which the aroma of the hops can be dispersed. From the mill the prepared or pulverized hops should be conveyed to a closed tank or receptacle where a suitable solvent is applied. The solvent which I have found most efficient is acetone, although it may be noted that the essential principles of hops, namely, hop oil, lupulin, tannin, and hop seed oil are partly soluble in either petrolic ether, alcohol, methanol, high grade gasoline, ethyl acetate, etc., and in certain hot fatty oils.

I then mix with the powdered hops a highly efficient solvent, acetone. The amount of acetone applied will depend somewhat on the amount of moisture in the dried hops, and also on their age, which affects the percentage of gamma or hardened resins they contain. In general, however, it will be found that one pound of acetone should be applied to one pound of pulverized hops. This application of solvent should be made in a closed container, as the solvent is volatile and in an open container evaporates rapidly, carrying off by evaporation a small fraction of the desirable hops aroma.

The length of time which the pulverized hops should be submitted to the action of the acetone in the closed container will depend upon the age of the hops and the extent to which the resins in the lupulin have hardened. If the hops are fresh and have been dehydrated at low temperatures the percentage of hardened or gamma resins will be less than those in hops which were subjected to a higher degree of heat in dehydrating, and particularly those of older growth and those which have been stored in uncooled warehouses. For fresh hops, dehydrated at low temperatures and kept in cooled storerooms, an hour will be sufficient time for the action of the solvent to soften and make soluble the lupulin. For hops of older growth and those which were subjected to greater heat in drying and storing, the period of time which they would be subjected to the action of the solvent might be extended to twenty-four hours, or even longer.

After the hops have been submitted to the action of the acetone for the required period of time, they should be moved in a closed conveyor to a percolator, also closed, for the extraction of a considerable portion of the solvent and extract. This process of percolation can be expedited by the use of a vacuum pump, if desired.

When old hops are used in which the lupulin has hardened and particularly those in which a rancid odor has occurred from the oxidation of hop oil, I employ activated carbon, which may be made from the vegetable fibrous material of the hops residue after extraction has been made by percolation and pressure. This activated carbon may be used in two ways;

(a) By mixing it in finely powdered form with the pulverized hops while they are in a dry state. When this method is employed one-fourth ounce of activated carbon will be used to each pound of pulverized hops. The prepared hops should be stirred and shaken until the activated carbon has been thoroughly mixed with them, then be permitted to stand in a closed container for a period of time not less than two hours. The activated carbon absorbs the excess oxygen of oxidized material which has produced the rancidity and thus restores the odor of fresh hops.

(b) Or, the activated carbon may be applied to the liquid extract, in which one-fourth ounce of activated carbon is used to each pound of the extract; permitting it to slowly settle; and after a period of from two to four hours the carbon may be removed from the extract by filtration or the extract may be removed from the carbon by means of a syphon.

The extract thus obtained by percolation will contain nearly all of the solvent employed, but will not contain as large a percentage or fraction of the resinous lupulin as it will carry. The extract obtained by this percolation may then be reemployed on another similar portion of pulverized hops, and the process repeated until the extract has reached the point of saturation, which will be indicated by its specific gravity as well as by the degree of its liquidity.

After the pulverized hops have been submitted in this way to the action of the acetone in the tank and in the percolators, the hops are then conveyed in a closed container to a press, preferably of the hydraulic type to avoid heat, in which sufficient pressure is applied to express from the hops residue all of the extract obtainable, after which the residue of hops will be found upon inspection or analysis to contain nothing but vegetable fibrous materials and no tannin, oils, or lupulin. This shows that all of the essential principles of the hops have been entirely extracted.

The liquid extract obtained from these several percolations and from the pressing of the hops is then put into an evaporating pan or preferably a jacketed vacuum still, and a degree of heat (60° C.) is applied sufficient only to evaporate all the acetone.

After finding by analysis the amount of tannin and lupulin which the extract contains, I carefully measure, weigh, observe its degree of liquidity, and by an observation of its specific gravity, etc., and by applying the same tests to subsequent lots manufactured, I secure uniformity by the addition of an amount of alcohol, glyceryl laurate, and tannin sufficient to secure such uniformity. The amount of glyceryl laurate used will vary but in any event would not be more than one ounce to each pound of emulsion produced. The function of the addition of this glyceryl laurate is two fold; first, to continue the resinous material in a soft solvent condition, and to make it soluble in the hop wort; second, it assists in the emulsification of the resinous material.

To the hops extract obtained as above described, or in any other suitable manner, I add an equal amount of malt syrup, preferably made from barley malt. The mixture is put into a homogenizer, or into what is known as a colloidal machine, which is commonly employed in making other emulsions, and in which the mixture is beaten until the small particles of resinous lupulin contained in the hops extract are finely divided. No emulsifying agent such as gum tragacanth or other gums usually employed in the making of emulsions is used in this process. The result is a very perfect emulsion which will retain its form without separation indefinitely.

Due to the fact that by my process of making the hops extract I have made available and retained all of the hop seed oil found in the seeds in the hops blossoms, I assume that this oil has a beneficial effect in the making of this emulsion. To some extent, it produces the same effect as the oils used in the making of other emulsions. Among the advantages in the use of this emulsion in the place of bulk hops in brewing are the following:

First, by effecting a much finer division of the resinous lupulin, the resins which give a bitter flavor to all beer and ale are much more quickly dissolved in and assimilated by the hot water used in brewing.

Second, a better distribution of the lupulin in the beer is obtained than by the use of boiling bulk hops in the wort.

Third, its use in this finely divided form greatly shortens the time required to hop the beer by the methods now employed.

Fourth, this emulsion has the same advantages as follows the use of hop extract in the creation and maintenance of foam on the beer when it is served. This is produced by the small fraction of hop seed oil found in the extract.

Fifth, another advantage is that due to the finer subdivision of the flavoring principles, the emulsion is more quickly and evenly dispersed in the wort or unfinished beer and the time required for cooking the bulk hops in the beer therefore, the time of making each brew is considerably shortened. To illustrate: Most brewers cook the hops in the wort for from one to two hours after the cooking of the grain has been completed. In brewing tests which we have made, we secure the same result by stopping the brewing or cooking as soon as we have introduced the emulsion. The agitation of the boiling wort or unfinished beer will disperse it throughout the contents of the kettle and the cooking can be stopped immediately. Thus the time of brewing is considerably shortened.

In further explanation, we have found that four ounces of emulsion containing only about one ounce of hop extract will flavor as much beer as four ounces of extract or as one pound of bulk hops. This can only be explained by the fact that in emulsifying the resinous lupulin contents of the hops or hops extract, we subdivide each particle of these flavoring constituents into many thousands of finer particles. That is the principal reason for putting it into the form of an emulsion rather than in the form of an extract. It greatly increases the flavoring power or ability as compared with the extract or bulk hops from which it is made.

The method or process above described for the making of hops emulsion is entirely a cold one. The advantage of a cold process over the prior art is that it retains all of the aromatic principles of the hops, which are easily volatilized and driven off by the application of heat. The only stage of the process in which any heat is used is to vaporize the acetone, and only a slight degree of heat—not over 60 degrees C.—is required for that purpose.

What I claim is:

1. The process for making an emulsion of the essential principles of hops, consisting in subjecting the hops to acetone in a closed container for a period of time, and subsequently subjecting the product to percolation, and thereafter applying mechanical pressure to the hops, adding to the hop extract an equal amount of malt syrup made from barley malt, and beating the mixture together in a suitable apparatus to produce the emulsion, whereby to recover a larger percentage of the volatile hop oil than is obtained by other known methods.

2. The process for making an emulsion of the essential principles of hops, consisting in pulverizing the hops, placing the hops in a closed container and subjecting them to the solvent action of acetone, adding activated carbon in the proportion of one-fourth ounce of activated carbon to each pound of the extract, permitting it to slowly settle, and after a period of two to four hours separating the carbon and extract by filtration, and applying sufficient pressure to express from the hops all of the extract contained therein, whereby to produce an extract containing the same percentage or proportions of hop oil, lupulin, tannin and hop seed oil as are found in fresh hops, adding to the hop extract an equal amount of malt syrup, and beating the mixture together in a suitable apparatus to produce the emulsion.

3. The process for making an emulsion of the essential principles of hops, consisting in pulverizing the hops, placing the hops in a closed container and subjecting them to the solvent action of acetone, adding activated carbon in the proportion of one-fourth ounce of activated carbon to each pound of the extract, permitting it to slowly settle, and after a period of two to four hours separating the carbon and extract by filtration, and applying sufficient pressure to express from the hops all of the extract contained therein, whereby to produce an extract containing the same percentage or proportions of hop oil, lupulin, tannin and hop seed oil as are found in fresh hops, adding to the hop extract an equal amount of malt syrup, and beating the mixture together in a suitable apparatus to produce the emulsion, whereby the emulsion may take the place of bulk hops in brewing and shorten the time of brewing.

4. A process for making an emulsion of the essential principles of hops, consisting in pulverizing the hops, mixing acetone with the powdered hops in a closed container for the required period of time, obtaining a substantial portion of the extract by percolation, thereafter applying sufficient pressure to express from the hops all of the extract content in the hops, all of said steps being carried through without the application of heat, evaporating the acetone from the extract, adding activated carbon and thereafter removing same, adding to the hops mixture a suitable quantity of malt syrup from barley malt, and beating the mixture together to produce an emulsion.

5. The process for making an emulsion of the essential principles of hops, consisting in mixing acetone with powdered hops in a closed container for the required period of time to dissolve the lupulin, hop oil, tannin and hop seed oil, obtaining a substantial portion of the extract by percolation, and thereafter applying sufficient pressure to express from the hops all of the extract therein, adding activated carbon to the extract in the proportion of substantially one-fourth ounce of activated carbon to each pound of liquid extract of hops, separating the activated carbon from the liquid extract, and adding to the extract an equal amount of malt syrup made from barley malt and beating the mixture together to produce an emulsion.

6. The process for making an emulsion of the essential principles of hops, consisting in pulverizing the hops, placing the hops in a closed container and subjecting them to the solvent action of acetone, adding activated carbon in the proportion of one-fourth ounce of activated carbon to each pound of the extract, permitting it to slowly settle, and after a period of two to four hours separating the carbon and extract by syphoning, and applying sufficient pressure to express from the hops all of the extract contained therein, whereby to produce an extract containing the same percentage or proportion of hop oil, lupulin, tannin and hop seed oil as are found in fresh hops, adding to the hop extract an equal amount of malt syrup, and beating the mixture together in a suitable apparatus to produce the emulsion.

7. The process for making an emulsion of the essential principles of hops, consisting in pulverizing the hops, placing the hops in a closed container and subjecting them to the solvent action of acetone, adding activated carbon in the proportion of one-fourth ounce of activated carbon to each pound of the extract, permitting it to slowly settle, and after a period of two to four hours separating the carbon and extract by syphoning, and applying sufficient pressure to express from the hops all of the extract contained therein, whereby to produce an extract containing the same percentage or proportions of hop oil, lupulin, tannin and hop seed oil as are found in fresh hops, adding to the hop extract an equal amount of malt syrup, and beating the mixture together in a suitable apparatus to produce the emulsion, whereby the emulsion may take the place of bulk hops in brewing and shorten the time of brewing.

LYNDON D. WOOD.